United States Patent
Li et al.

(10) Patent No.: US 12,119,865 B2
(45) Date of Patent: Oct. 15, 2024

(54) FLEXIBLE FREQUENCY HOPPING

(71) Applicant: ZTE Corporation, Guangdong (CN)

(72) Inventors: Jian Li, Guangdong (CN); Peng Hao, Guangdong (CN); Xianghui Han, Guangdong (CN); Yiwei Deng, Guangdong (CN)

(73) Assignee: ZTE Corporation, Guangdong (CN)

( * ) Notice: Subject to any disclaimer, the term of this patent is extended or adjusted under 35 U.S.C. 154(b) by 52 days.

(21) Appl. No.: 17/814,639

(22) Filed: Jul. 25, 2022

(65) Prior Publication Data

US 2022/0393717 A1    Dec. 8, 2022

Related U.S. Application Data

(63) Continuation of application No. PCT/CN2020/100778, filed on Jul. 8, 2020.

(51) Int. Cl.
*H04B 1/71* (2011.01)
*H04B 1/7136* (2011.01)

(52) U.S. Cl.
CPC ................... *H04B 1/7136* (2013.01)

(58) Field of Classification Search
CPC .............................. H04B 1/713; H04B 1/7136
See application file for complete search history.

(56) References Cited

U.S. PATENT DOCUMENTS

| | | | |
|---|---|---|---|
| 2019/0053211 A1 | 2/2019 | Ying et al. | |
| 2021/0360616 A1* | 11/2021 | Yi | H04L 5/0012 |
| 2022/0123885 A1 | 4/2022 | Shin et al. | |
| 2023/0072427 A1* | 3/2023 | Jung | H04B 7/0617 |

OTHER PUBLICATIONS

Apple "remaining issues on PUSCH enhancements; 3GPP TSG WG1 #100-e RS-2000856"; Feb. 24-Mar. 6, 2020; 4 pages (Year: 2020).*
CATT, "On enhancements to configured UL grant operation," 3GPP TSG RAN WG1 #95, Spokane, USA, R1-1812633, 5 pages, Nov. 12-16, 2018.
ZTE, "Remaining issues on PUSCH enhancements for NR URLLC," 3GPP TSG RAN WG1 #100, e-Meeting, R1-2000357, 7 pages, Feb. 24-Mar. 6, 2020.
ISA, International Search Report for International Application No. PCT/CN2020/100778, Mail Date Apr. 9, 2021. 6 pages.

(Continued)

*Primary Examiner* — Rahel Guarino
(74) *Attorney, Agent, or Firm* — Perkins Coie LLP

(57) ABSTRACT

Methods, apparatus, and systems for enabling a flexible frequency hopping mechanism are described. In one example aspect, a wireless communication method is disclosed. The method includes receiving, by a communication device, a first message from a network device. The first message comprises a list of frequency hopping offsets and a value indicating a number of repetitions of a data transmission. The method also includes receiving, by the communication device, a second message selecting a frequency hopping offset from the list of frequency hopping offsets and applying multiple frequency hopping offsets to the number of repetitions of the data transmission. The multiple frequency offsets are determined according to a rule associated with the selected frequency hopping offset.

18 Claims, 13 Drawing Sheets

(56) References Cited

OTHER PUBLICATIONS

Co-Pending EP Application, Extended Search Report for Application No. 20944739.0, Mail Date Nov. 11, 2022 9 pages.
MediaTek "Enhancements of NR PUSCH for URLLC Document for: Discussion and Decision", 3GPP TSG RAN WG1 Meeting AH-1901 Taipei, Taiwan, Jan. 21-25, 2019, R1-1900210, 8 pages.
Apple "Remaining issues on PUSCH enhancements" 3GPP TSG RAN WG1 #100-e, e-Meeting, Feb. 24-Mar. 6, 2020, R1-2000856, 4 pages.
Co-Pending EP Application, Article 94 Communication for Application No. 20944739.0, Mail Date Mar. 26, 2024, 7 pages.

\* cited by examiner

```
                    ┌─────────────────────────────┐   ┌─────────────────────────────┐
                    │ 1110 — transmitting, by a   │   │ 1120 — transmitting, by the │
                    │ base station, a first       │   │ base station, a second      │
                    │ message to a communication  │   │ message indicating a        │
                    │ device that comprises a     │   │ selected frequency hopping  │
                    │ list of frequency hopping   │   │ offset in the list of       │
                    │ offsets and a value         │   │ frequency hopping offsets   │
                    │ indicating a number of      │   │ to enable the communication │
                    │ repetitions of a data       │   │ devices to apply multiple   │
                    │ transmission                │   │ frequency hopping offsets   │
                    │                             │   │ to the number of            │
                    │                             │   │ repetitions of the data     │
                    │                             │   │ transmission                │
                    └─────────────────────────────┘   └─────────────────────────────┘
```

FLEXIBLE FREQUENCY HOPPING

CROSS-REFERENCE TO RELATED APPLICATION

This application claims priority to International Application No. PCT/CN2020/100778, filed on Jul. 8, 2020, the disclosure of which is hereby incorporated by reference herein in its entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques that enable a flexible frequency hopping mechanism. In one advantageous aspect, in some embodiments, these techniques may be used to increase frequency diversity gain and achieve better channel estimation performance over conventional techniques.

In one example aspect, a wireless communication method is disclosed. The method includes receiving, by a communication device, a first message from a network device. The first message comprises a list of frequency hopping offsets and a value indicating a number of repetitions of a data transmission. The method also includes receiving, by the communication device, a second message selecting a frequency hopping offset from the list of frequency hopping offsets and applying multiple frequency hopping offsets to the number of repetitions of the data transmission. The multiple frequency offsets are determined according to a rule associated with the selected frequency hopping offset.

In another example aspect, a wireless communication method is disclosed. The method includes transmitting, by a network device, a first message to a communication device that comprises a list of frequency hopping offsets and a value indicating a number of repetitions of a data transmission and transmitting, by the network device, a second message indicating a selected frequency hopping offset in the list of frequency hopping offsets to enable the communication devices to apply multiple frequency hopping offsets to the number of repetitions of the data transmission, wherein the multiple frequency offsets are determined according to a rule associated with the selected frequency hopping offset.

In another example aspect, a communication apparatus is disclosed. The apparatus includes a processor that is configured to implement an above-described method.

In yet another example aspect, a computer-program storage medium is disclosed. The computer-program storage medium includes code stored thereon. The code, when executed by a processor, causes the processor to implement a described method.

These, and other, aspects are described in the present document.

BRIEF DESCRIPTION OF DRAWINGS

FIG. 11 is a flowchart of another method for wireless communication in accordance with one or more embodiments of the present technology.

DETAILED DESCRIPTION

Section headings are used in the present document only to improve readability and do not limit scope of the disclosed embodiments and techniques in each section to only that section. Certain features are described using the example of Fifth Generation (5G) wireless protocol. However, applicability of the disclosed techniques is not limited to only 5G wireless systems.

Frequency hopping is one of the techniques that can be used to improve the uplink performance by providing frequency diversity and interference averaging. In Long-Term Evolution systems, the hopping can be between subframes (inter-subframe) or within a subframe (intra-subframe). In the 5G system, the hopping has been extended to be between slots (inter-slot hopping) and/or within a slot (intra-slot hopping). Furthermore, to avoid transmitting a long transmission on the Physical Uplink Shared Channel (PUSCH) across slot boundary, a User Equipment (UE) can perform small transmissions on the PUSCH in several repetitions scheduled by an uplink (UL) grant or a Radio Resource Configuration (RRC) message in the consecutive available slots. For example, AggregationFactor is used to allow one Downlink Control Indication (DCI) message to schedule multiple consecutive uplink slots or mini-slots for PUSCH. The number of the consecutive slots or mini-slots can be 2 or 4 or 8. The number of slots or mini-slots can be determined by the RRC parameter pusch-AggregationFactor. Table 1 illustrates an example redundancy version for PUSCH transmissions.

TABLE 1

Redundancy version for PUSCH transmission

| rv$_{id}$ indicated by the DCI scheduling the PUSCH | rv$_{id}$ to be applied to n$^{th}$ transmission occasion (repetition Type A) or n$^{th}$ actual repetition (repetition Type B) | | | |
|---|---|---|---|---|
| | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

Figure 1:
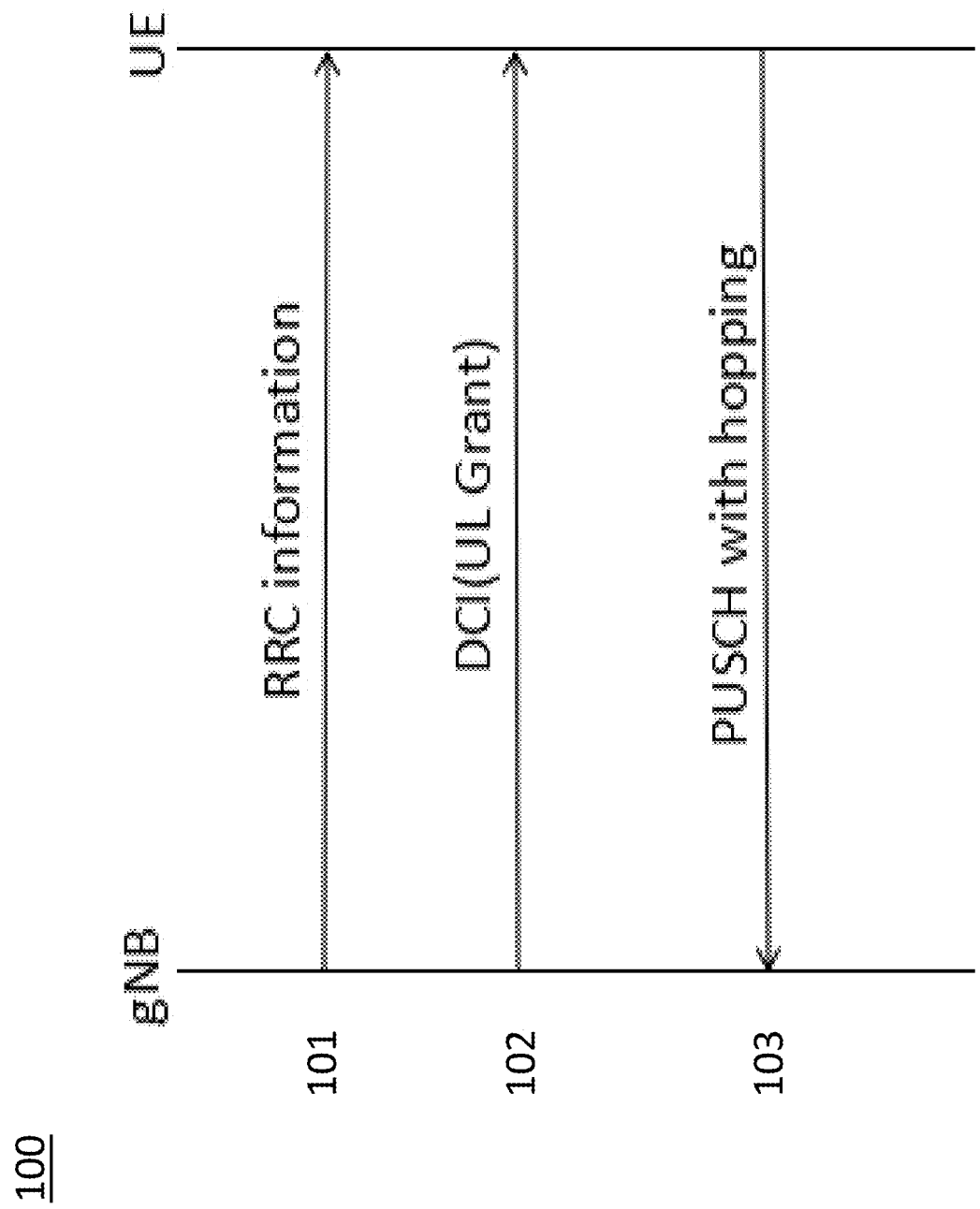
FIG. 1 illustrates an example signaling procedure for configuring frequency hopping in transmission repetitions in accordance with one or more embodiments of the present technology.

FIG. 1 illustrates an example signaling procedure 100 for configuring frequency hopping in transmission repetitions in accordance with one or more embodiments of the present technology.

Operation 101: The network device (e.g., a base station eNB/gNB) transmits RRC information to a UE. The RRC information includes at least parameters such as the aggregation factor for number of repetitions and a list of hopping offsets (e.g., pusch-AggregationFactor and frequencyHoppingOffsetLists or frequencyHoppingOffsetListsForDCI-Format0-2-r16).

Operation 102: The network device (e.g., a base station eNB/gNB) transmits a DCI signaling to the UE to schedule an UL grant. The DCI signaling can have the format of 0-0, 0-1, or 0-2. The DCI can include a flag including whether frequency hopping is enabled. The DCI can also indicate which frequency offset is to be used.

Operation 103: The UE determines the RB offset of different hops and performs PUSCH transmissions accordingly.

Conventionally, the same frequency hopping offset is used for all hops. In case of intra-slot frequency hopping, the starting resource block (RB) in each hop is given by:

$$RB_{start} = \begin{cases} RB_{start} & i = 0 \\ (RB_{start} + RB_{offset}) \bmod N_{BWP}^{size} & i = 1 \end{cases} \quad \text{Eq. (1)}$$

Figure 2:
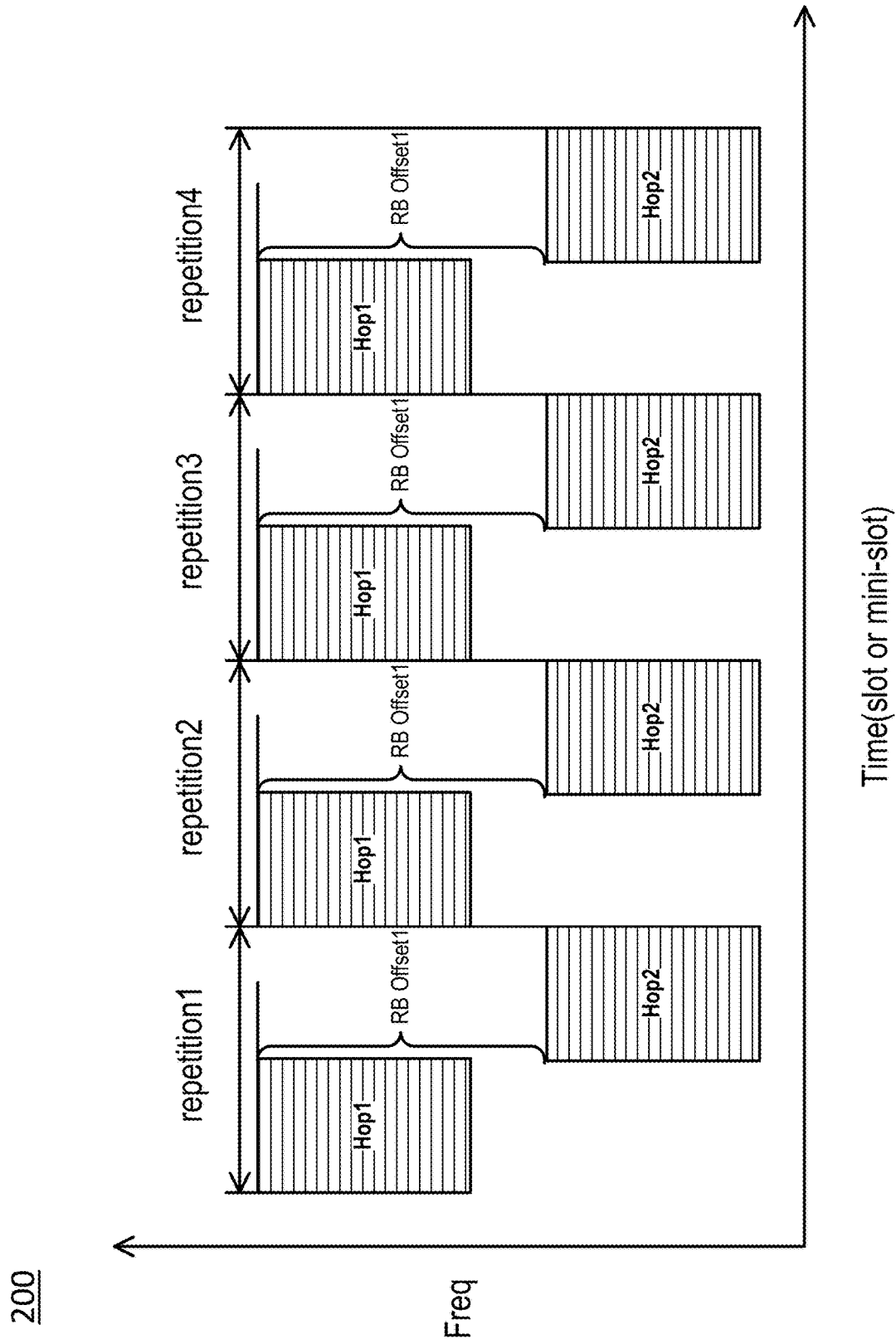
FIG. 2 illustrates an example of intra-slot frequency hopping.

$RB_{start}$ is the starting RB within the UL BWP, as calculated from the resource block assignment information of resource allocation type 1 and $RB_{offset}$ is the frequency offset in RBs between the two frequency hops. The number of symbols in the first hop is given by $\lfloor N_{symb}^{PUSCH,s}/2 \rfloor$ the number of symbols in the second hop is given by $N_{symb}^{PUSCH,s} - \lfloor N_{symb}^{PUSCH,s}/2 \rfloor$, where $N_{symb}^{PUSCH,s}$ is the length of the PUSCH transmission in OFDM symbols in one slot. FIG. 2 illustrates an example of intra-slot frequency hopping. In this example, RB Offset 1 is indicated by the DCI signaling in Operation 102 as shown in FIG. 1. The same RB offset is applied to all repetitions for Hop2.

In case of inter-slot frequency hopping, the starting RB during slot $n_s^\mu$ is given by:

$$RB_{start}(n_s^\mu) = \begin{cases} RB_{start} & n_s^\mu \bmod 2 = 0 \\ (RB_{start} + RB_{offset}) \bmod N_{BWP}^{size} & n_s^\mu \bmod 2 = 1 \end{cases} \quad \text{Eq. (2)}$$

Figure 3:
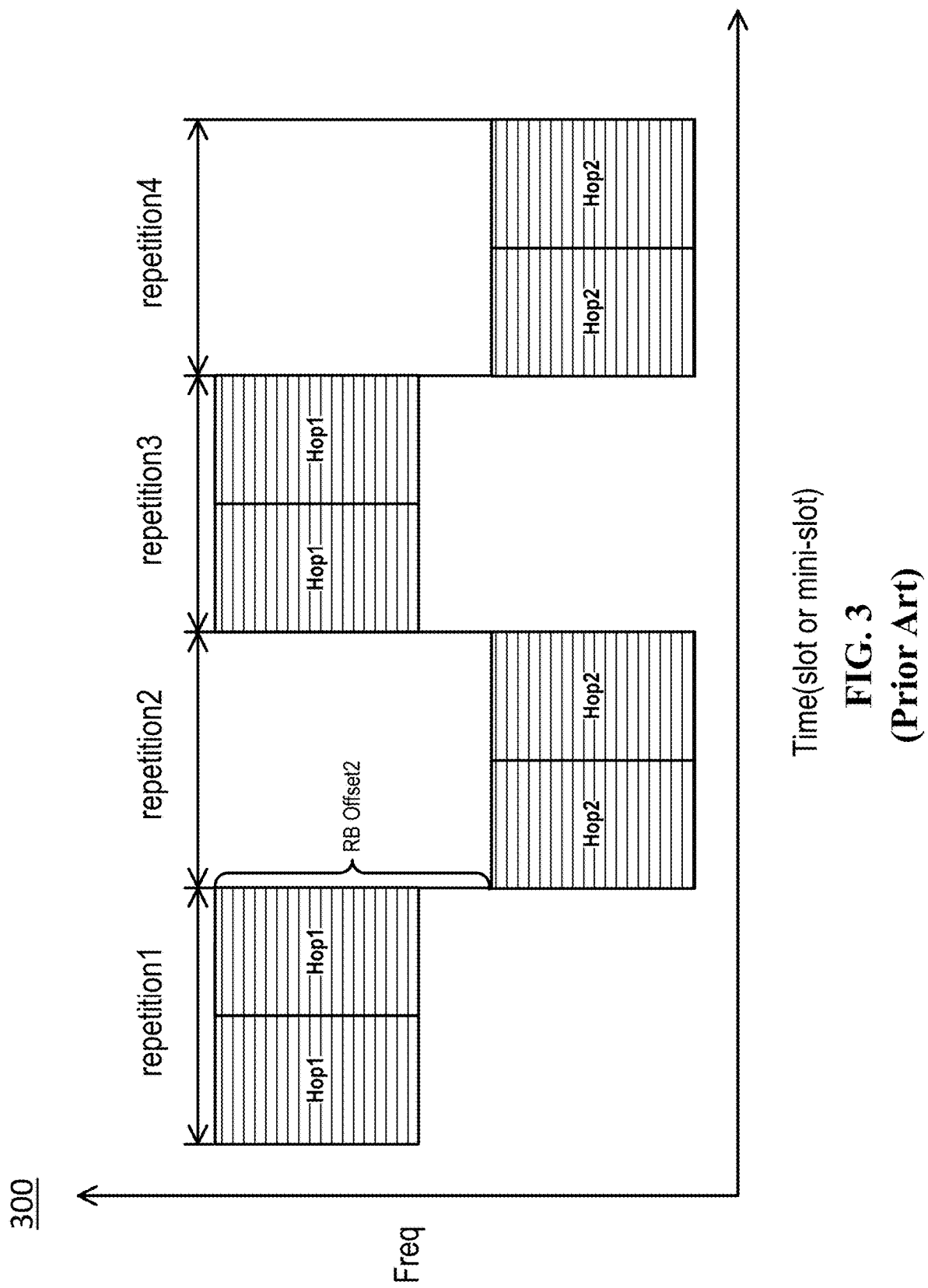
FIG. 3 illustrates an example of inter-slot frequency hopping.

Here, $n_s^\mu$ is the current slot number within a radio frame, where a multi-slot PUSCH transmission can take place, $RB_{start}$ is the starting RB within the UL BWP, as calculated from the resource block assignment information of resource allocation type 1 and $RB_{offset}$ is the frequency offset in RBs between the two frequency hops. FIG. 3 illustrates an example of inter-slot frequency hopping. In this example, RB Offset 2 is indicated by the DCI signaling in Operation 102 as shown in FIG. 1. The same RB offset is applied to all repetitions for Hop2.

Increasing frequency hopping for PUSCH can improve performance because it can provide frequency diversity gain. However, as shown in FIGS. 2-3, currently only one offset can be used for different hops in transmission repetitions, which may potentially lead to inter-cell interference. To mitigate the inter-cell interference, particularly for UEs located at cell edges, a more flexible frequency pattern is desirable. This patent document discloses a flexible frequency hopping mechanism that increases frequency diversity gain and achieves better channel estimation performance. The disclosed techniques can be used in conjunction with current frequency hopping methods (e.g., slot-based repetition PUSCH repetition Type A and/or mini-slot based repetition PUSCH repetition Type B) to reduce inter-cell interference in suitable situations. The disclosed techniques can also be extended to support more hopping offsets (e.g., 8, 16 or even 32 offsets) for future generations of wireless communication techniques.

In some embodiments, in addition to intra-slot and inter-slot frequency hopping methods, an additional hopping mode can be provided. For example, a separate mode (e.g., intraInterMixedSlot) can be indicated in the RRC signaling (e.g., in Operation 101 as shown in FIG. 1).

frequencyHopping ENUMERATED {intraSlot, interSlot, intraInterMixedSlot} OPTIONAL, -- Need S Currently, up to four offset values can be configured by the RRC signaling. However, more offsets can be supported to allow flexible use of frequency hopping. For example, a list of eight offset values can be indicated as follows:

frequencyHoppingOffsetLists SEQUENCE (SIZE (1 . . . 8)) OF INTEGER (1 . . . maxNrofPhysicalResourceBlocks−1) OPTIONAL, -- Need M As another example, a list of sixteen offset values can be indicated as follows:

frequencyHoppingOffsetListsForDCI-Format0-2-r16 SEQUENCE (SIZE (1 . . . 16)) OF INTEGER (1 . . . maxNrofPhysicalResourceBlocks−1) OPTIONAL, -- Need M When more offset values are included in the RRC signaling, a corresponding number of bits (e.g., three bits for a list of eight values, or four bits for a list of 16 values) can be used in the DCI message to indicate at least one hopping offset.

Figure 4:
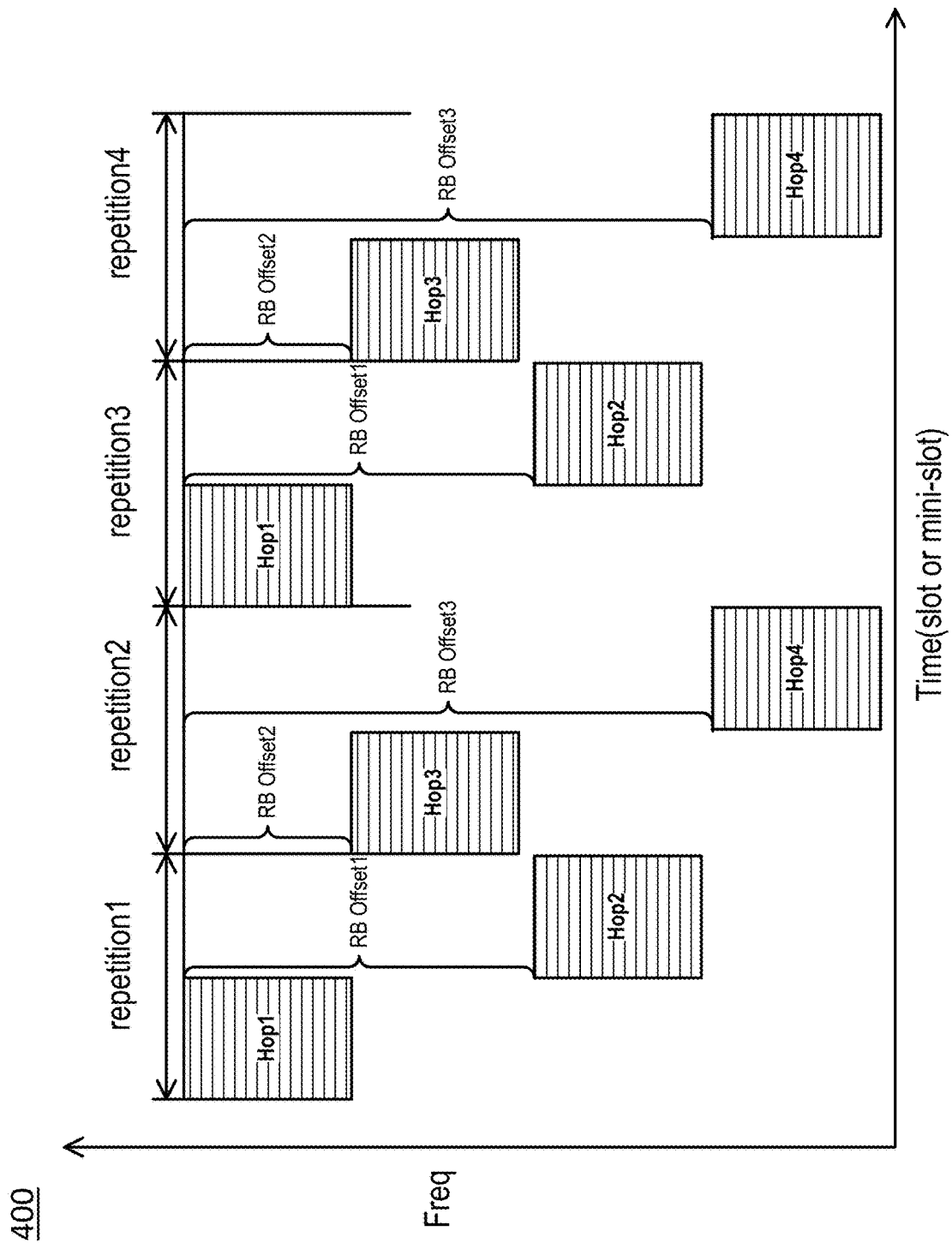
FIG. 4 illustrates an example of intra-slot frequency hopping in accordance with one or more embodiments of the present technology.

Instead of limiting a single offset value to be selected from the list, multiple offsets in the list of offset values can be adopted to allow variable hopping patterns. FIG. 4 illustrates an example of intra-slot frequency hopping 400 in accordance with one or more embodiments of the present technology. In the example shown in FIG. 4, frequencyHoppingOffsetLists is configured as {offset1, offset2, offset3, offset4}. Different offsets that are used for different hops can be determined based on a predetermined rule (e.g., a default order or configured by the network device). In this example, offset1 is applied to Hop2, offset2 is applied to Hop3, and offset3 is applied to Hop4.

Figure 5:
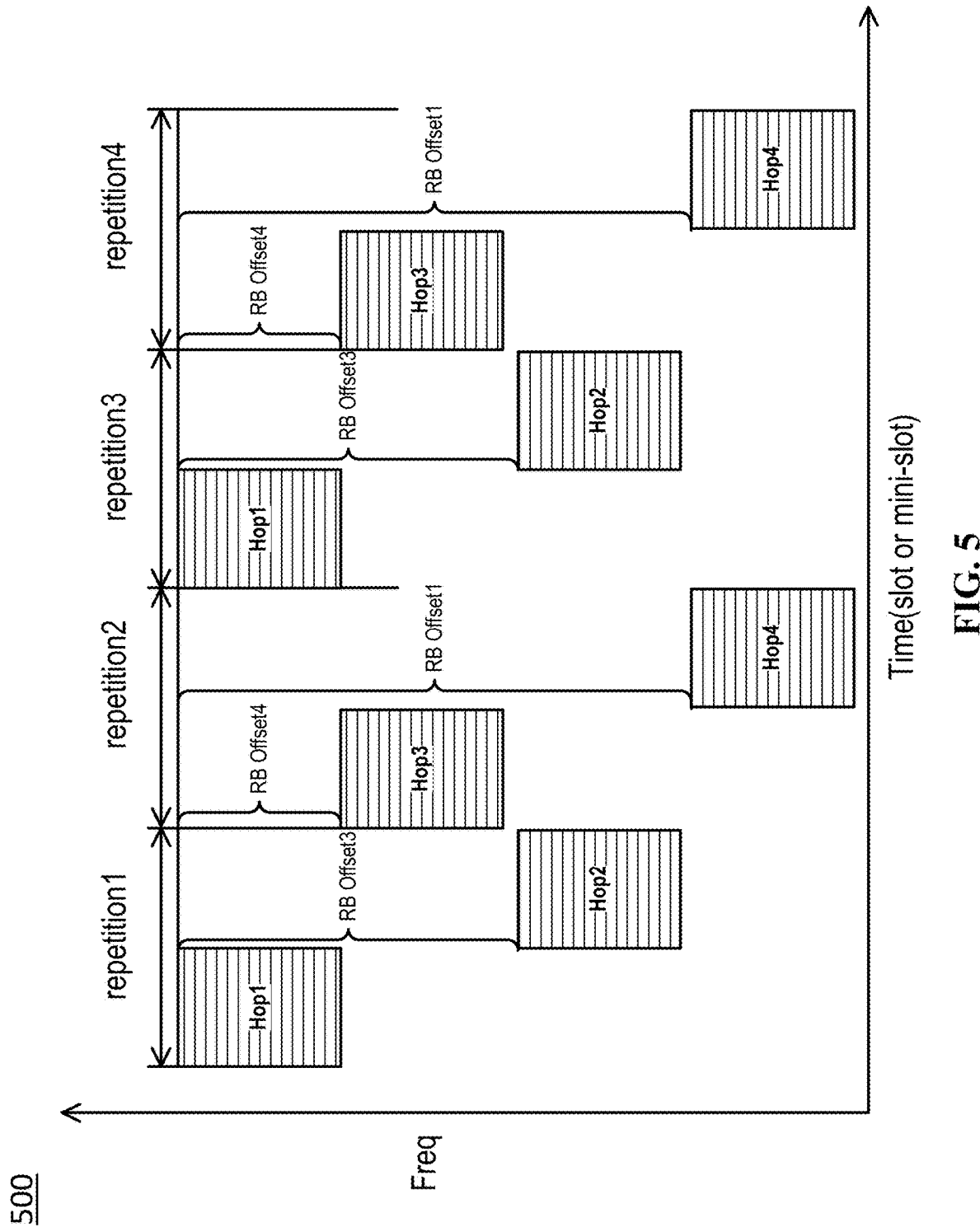
FIG. 5 illustrates another example of intra-slot frequency hopping in accordance with one or more embodiments of the present technology.

FIG. 5 illustrates another example 500 of intra-slot frequency hopping in accordance with one or more embodiments of the present technology. Different offsets that are used for different hops can be determined based on an order in which the offsets are arranged in the list. In this example, frequencyHoppingOffsetLists is configured as {offset1, offset2, offset3, offset4}. Two bits of the DCI message can be used to indicate an initial offset to be used: $N_{UL\_hop}$=2 (e.g., '10' as in binary) to indicate offset3. The offsets to be used start follow the order in which they are arranged in the list: offset3, offset4, offset1, offset2. In this example, offset3 is applied to Hop2, offset4 is applied to Hop3, and offset1 is applied to Hop4.

Figure 6:
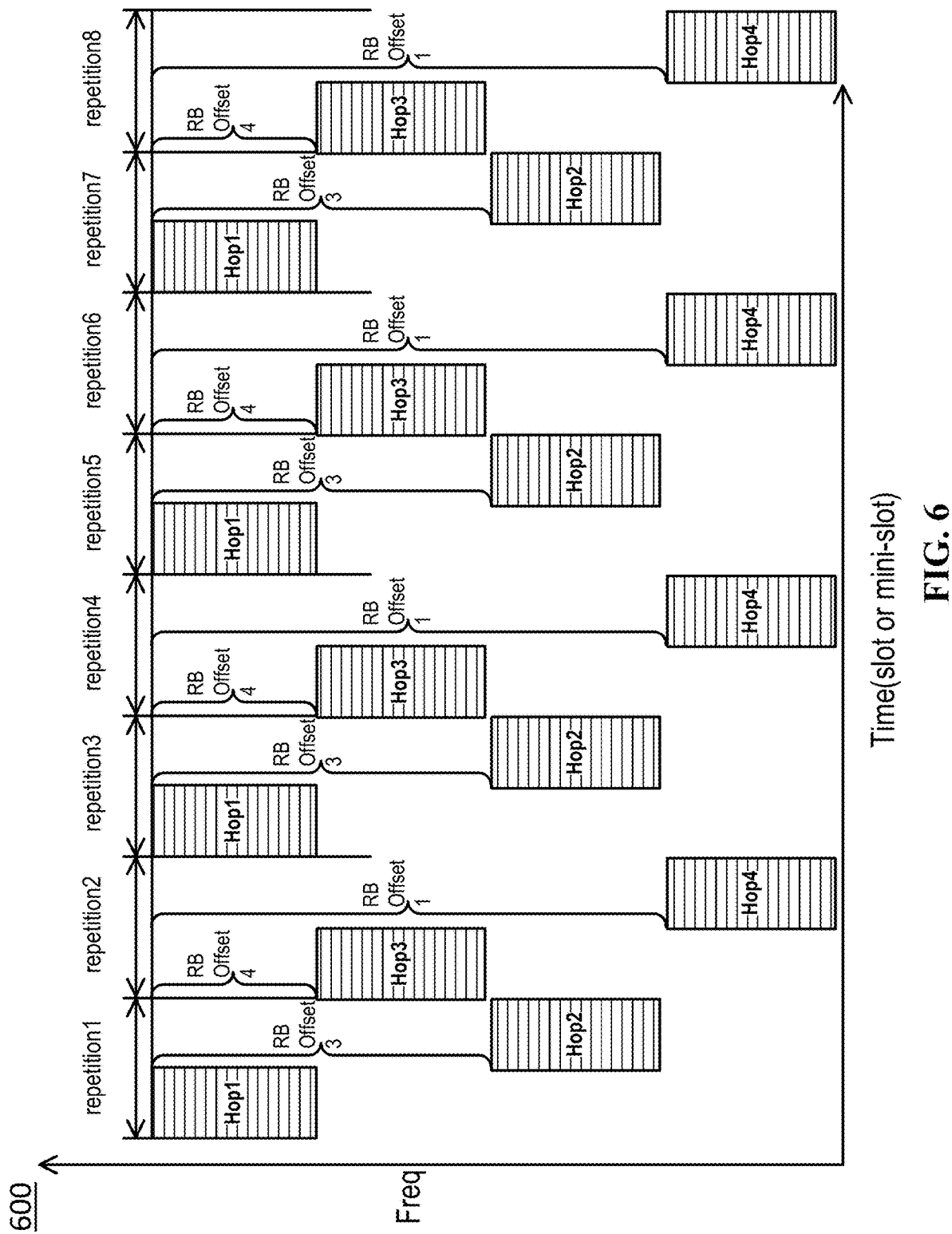
FIG. 6 illustrates another example of intra-slot frequency hopping in accordance with one or more embodiments of the present technology.

FIG. 6 illustrates another example 600 of intra-slot frequency hopping in accordance with one or more embodiments of the present technology. This example is similar to the example shown in FIG. 5 except that the transmission includes eight repetitions instead of four. Here, frequencyHoppingOffsetLists is also configured as {offset1, offset2, offset3, offset4}. Two bits of the DCI message can be used to indicate an initial offset to be used: $N_{UL\_hop}$=2 (e.g., '10' as in binary) to indicate offset3. The offsets to be used start follow the order in which they are arranged in the list: offset3, offset4, offset1, offset2. In this example, offset3 is applied to Hop2, offset4 is applied to Hop3, and offset1 is applied to Hop4; the offsets are then circularly repeated for subsequent hops.

Figure 7:
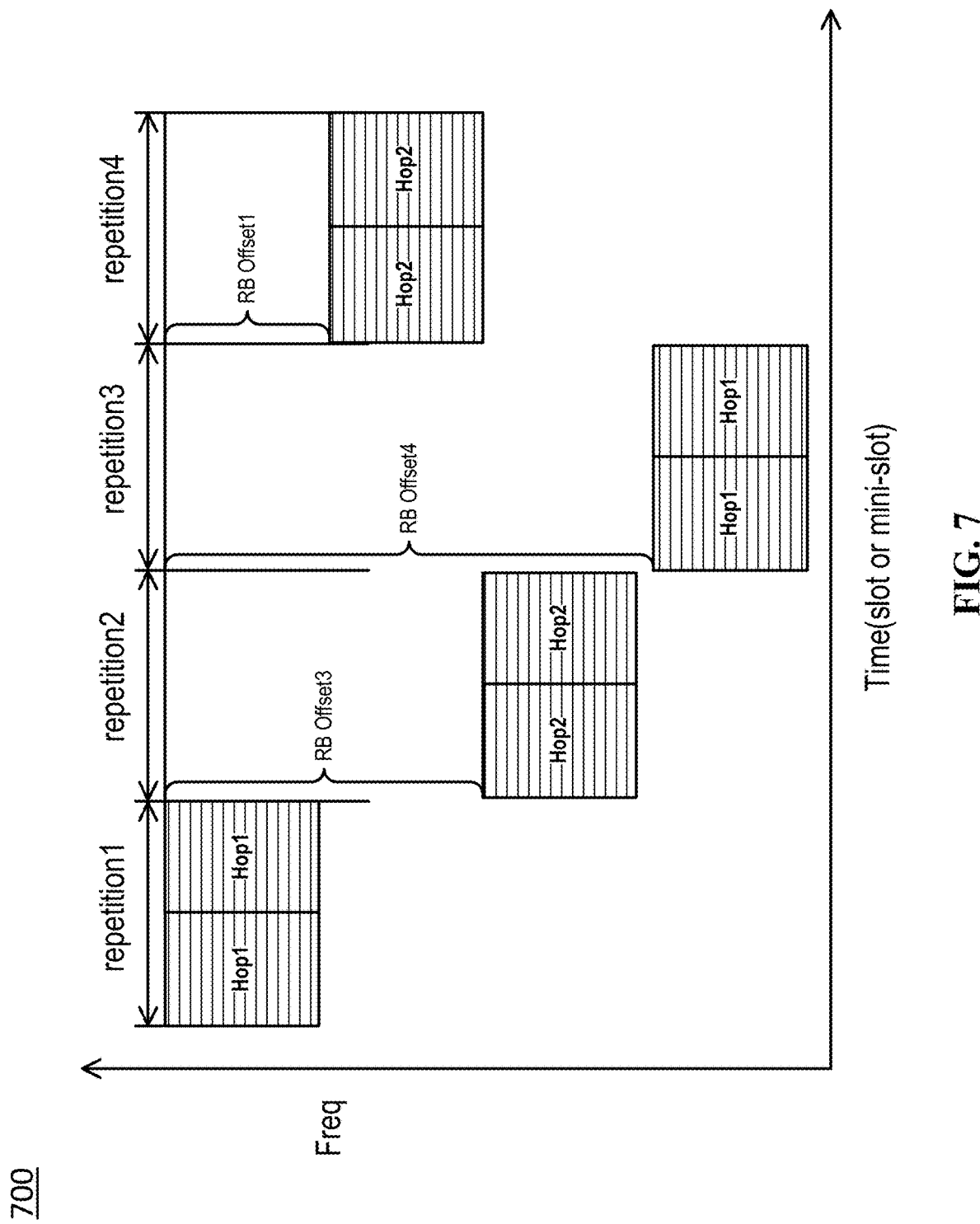
FIG. 7 illustrates an example of inter-slot frequency hopping in accordance with one or more embodiments of the present technology.

FIG. 7 illustrates an example 700 of inter-slot frequency hopping in accordance with one or more embodiments of the present technology. Similar to the example shown in FIG. 5, different offsets that are used for different hops can be determined based on an order in which the offsets are arranged in the list. In this example, frequencyHoppingOffsetLists is configured as {offset1, offset2, offset3, offset4}. Two bits of the DCI message can be used to indicate an initial offset to be used: $N_{UL\_hop}$=2 (e.g., '10' as in binary) to indicate offset3. The offsets to be used start follow the order in which they are arranged in the list: offset3, offset4, offset1, offset2. In this example, offset3 is applied to Hop2, offset4 is applied to the next Hop1, and offset1 is applied to the next Hop2.

Figure 8:
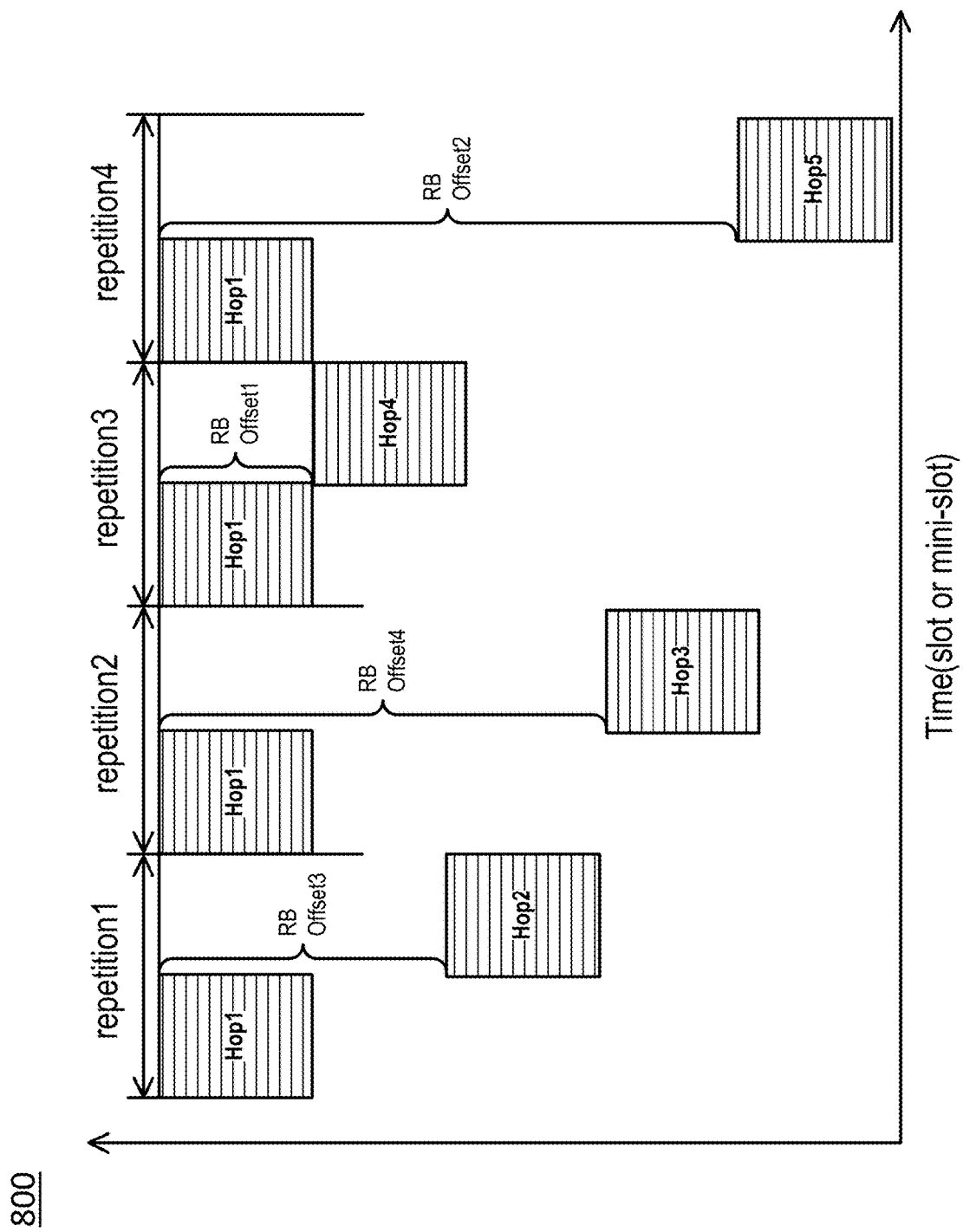
FIG. 8 illustrates yet another example of intra-slot frequency hopping in accordance with one or more embodiments of the present technology.

FIG. 8 illustrates yet another example of intra-slot frequency hopping 800 in accordance with one or more embodiments of the present technology. Different offsets that are used for different hops can be determined based on an order in which the offsets are arranged in the list. In this example, frequencyHoppingOffsetLists is configured as {offset1, offset2, offset3, offset4}. Two bits of the DCI message can be used to indicate an initial offset to be used: $N_{UL\_hop}$=2 (e.g., '10' as in binary) to indicate offset3. In this example, a predetermined rule specifies that no offset is applicable to Hop1. The rule further specifies that offsets are applied to other hops according to the order: offset3, offset4, offset1, offset2. In this example, offset3 is applied to Hop2, offset4 is applied to Hop3, offset1 is applied to Hop4, and offset 2 is applied to Hop5. As shown in the examples above, the combination of the DCI signaling and the predetermined rule allows a variety of frequency hopping patterns to be used for uplink transmissions so as to minimize interference and improve channel estimation performance.

In some embodiments, the UE needs to determine a support for the usage of the multiple frequency hopping offsets (e.g., to distinguish from legacy UEs that only support the intra-/inter slot hopping). In some embodiments, the support is indicated by the network device in at least a Radio Resource Control (RRC) message, a Medium Access Control (MAC) message, or a Downlink Control Indicator (DCI) message (e.g., using a specific format of the DCI message). In some embodiments, the support is indicated in capability information of the communication device. As another example, the support can be indicated by a Radio Network Temporary Identifier associated with the communication device.

Figure 9:
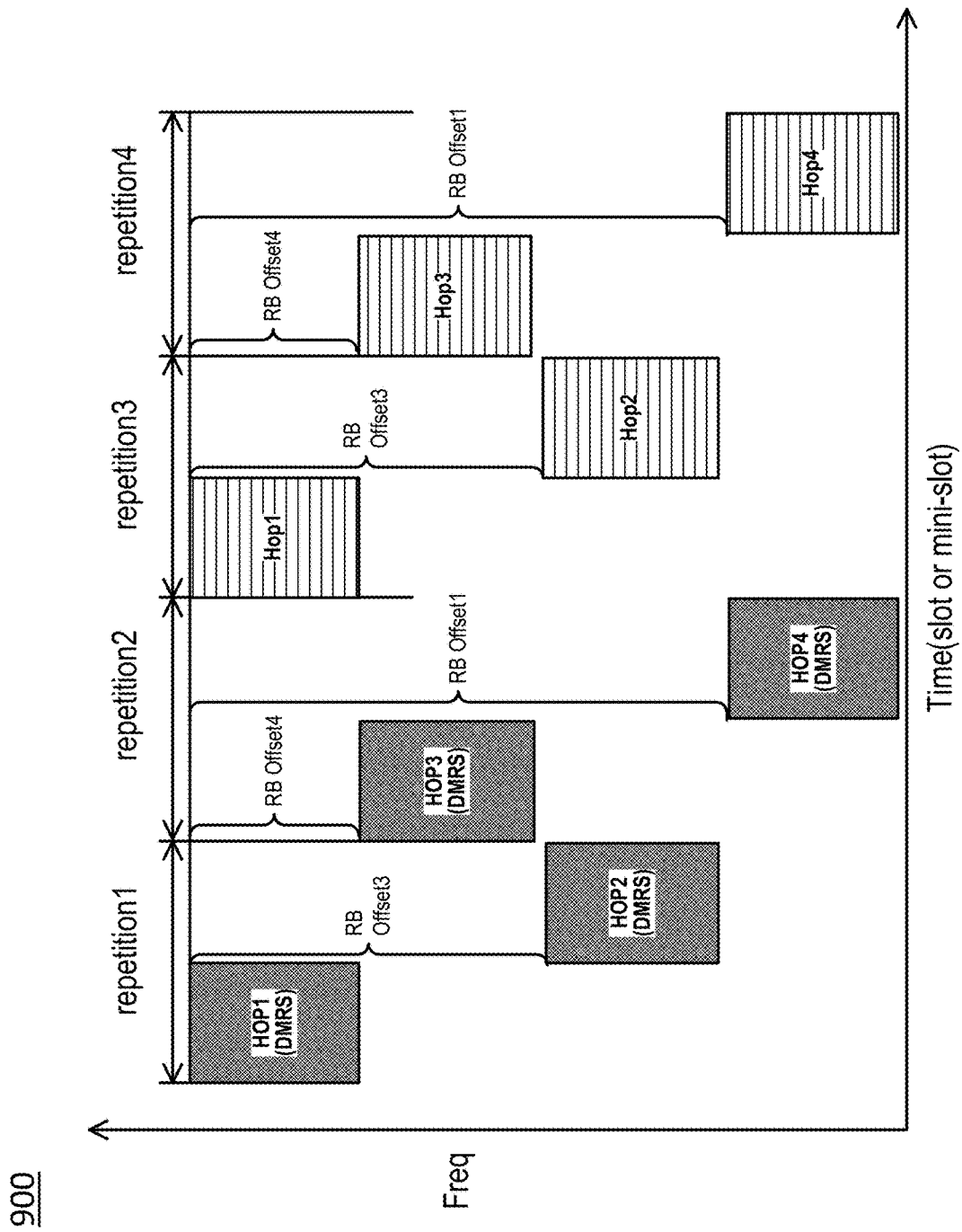
FIG. 9 illustrates an example of demodulation reference signal transmission in accordance with one or more embodiments of the present technology.

In some embodiments, a demodulation reference signal (DMRS) can be transmitted as part of the PUSCH transmission. To reduce signaling overhead, the demodulation reference signal can be transmitted in only a subset of the number of repetitions. FIG. 9 illustrates an example of DMRS transmission 900 in accordance with one or more embodiments of the present technology. The data transmission includes M repetitions (e.g., four repetitions). The DMRS is only transmitted in the N repetition(s) (e.g., the first two repetitions) and omitted in the remaining repetitions. In some embodiments, each hop can include K repetitions (e.g., two repetitions as shown in FIG. 9). The DMRS can be transmitted in L repetition(s) (e.g., the first repetition) and omitted in the remaining repetition(s). The values of M, N, K and L can be configured by the network device.

Figure 10:
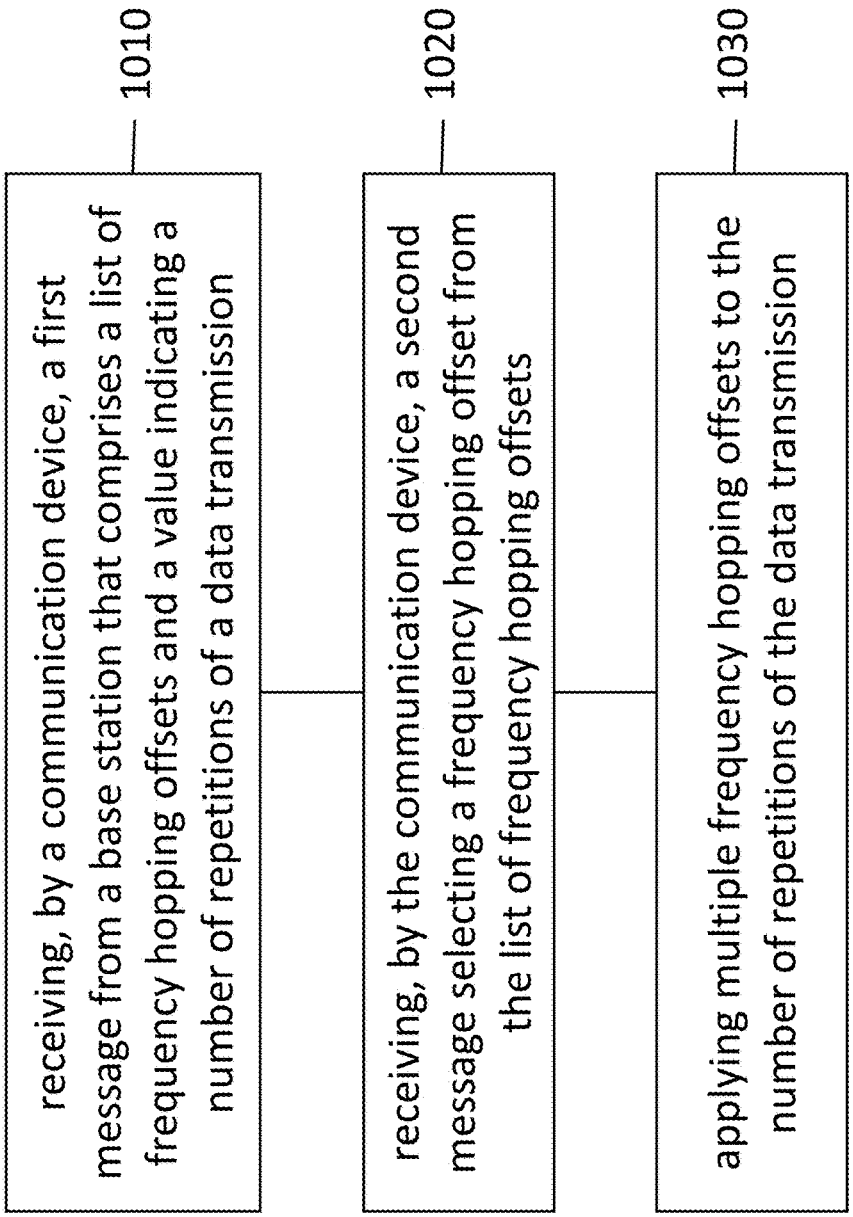
FIG. 10 is a flowchart of a method for wireless communication in accordance with one or more embodiments of the present technology.

FIG. 10 is a flowchart of a method for wireless communication 1000 in accordance with one or more embodiments of the present technology. The method 1000 includes, at operation 1010, receiving, by a communication device, a first message from a network device that comprises a list of frequency hopping offsets and a value indicating a number of repetitions of a data transmission. The method 1000 includes, at operation 1020, receiving, by the communication device, a second message selecting a frequency hopping offset from the list of frequency hopping offsets. The method 1000 includes, at operation 1030, applying multiple frequency hopping offsets to the number of repetitions of the data transmission. The multiple frequency offsets are determined according to a rule associated with the selected frequency hopping offset. The number of repetitions can be slot-based or mini-slot-based repetitions. In some embodiments, the network device can be implemented as a base station (e.g., eNB/gNB) and the communication device can be implemented as a UE.

In some embodiments, the first message further comprises a mode indicating usage of the multiple frequency hopping offsets in the data transmission. In some embodiments, the method includes determining, by the communication device, a support for the usage of the multiple frequency hopping offsets to the network device. In some embodiments, the support is indicated by the network device in at least a Radio Resource Control (RRC) message, a Medium Access Control (MAC) message, or a Downlink Control Indicator (DCI) message. In some embodiments, the support is indicated in capability information of the communication device. In some embodiments, the support is indicated by a Radio Network Temporary Identifier associated with the communication device.

In some embodiments, the list of frequency hopping offsets comprises four, eight, or sixteen frequency hopping offsets. In some embodiments, the selected frequency hopping offset is indicated using two, three, or four bits in the second message. In some embodiments, the applying of the multiple frequency hopping offsets comprises applying each of the multiple frequency hopping offsets to a corresponding repetition in the data transmission. In some embodiments, a first frequency hopping offset of the multiple frequency hopping offsets is the selected frequency hopping offset. In some embodiments, the rule specifies that the multiple frequency hopping offsets are determined according to an order in which frequency hopping offsets are organized in the list of frequency hopping offsets. In some embodiments, the rule specifies that the multiple frequency hopping offsets are determined according to a predefined order of frequency hopping offsets. In some embodiments, the rule is configurable by the network device.

In some embodiments, the data transmission further comprises transmitting a demodulation reference signal. In some embodiments, the demodulation reference signal is transmitted in a subset of the number of repetitions. In some embodiments, the data transmission comprises M repetitions, wherein the demodulation reference signal is transmitted in N repetitions and is omitted in remaining M−N repetitions, N and M being positive integers. In some embodiments, the data transmission comprises M repetitions for each hop, wherein the demodulation reference signal is transmitted in N repetitions for each hop and is omitted in remaining M−N repetitions for each hop, N and M being positive integers. In some embodiments, N and M are configured by the network device.

FIG. 11 is a flowchart of a method for wireless communication 1100 in accordance with one or more embodiments of the present technology. The method 1100 includes, at operation 1110, transmitting, by a network device, a first message to a communication device. The first message comprises a list of frequency hopping offsets and a value indicating a number of repetitions of a data transmission. The method 1100 includes, at operation 1120, transmitting, by the network device, a second message indicating a selected frequency hopping offset in the list of frequency hopping offsets to enable the communication devices to apply multiple frequency hopping offsets to the number of repetitions of the data transmission. The multiple frequency offsets are determined according to a rule associated with the selected frequency hopping offset. The number of repetitions can be slot-based or mini-slot-based repetitions. In some embodiments, the network device can be implemented as a base station (e.g., eNB/gNB) and the communication device can be implemented as a UE.

In some embodiments, the first message further comprises a mode indicating usage of the multiple frequency hopping offsets in the data transmission. In some embodiments, a support for the usage of the multiple frequency hopping offsets is indicated by the network device in at least a Radio Resource Control (RRC) message, a Medium Access Control (MAC) message, or a Downlink Control Indicator (DCI) message. In some embodiments, the list of frequency hopping offsets comprises four, eight, or sixteen frequency hopping offsets. In some embodiments, the selected frequency hopping offset is indicated using two, three, or four bits in the second message. In some embodiments, a first frequency hopping offset of the multiple frequency hopping offsets is the selected frequency hopping offset.

In some embodiments, the rule specifies that the multiple frequency hopping offsets are determined according to an order in which frequency hopping offsets are organized in the list of frequency hopping offsets. In some embodiments, the rule specifies that the multiple frequency hopping offsets are determined according to a predefined order of frequency hopping offsets. In some embodiments, the rule is configurable by the network device.

In some embodiments, the data transmission further comprises transmitting a demodulation reference signal. In some embodiments, the demodulation reference signal is transmitted in a subset of the number of repetitions. In some embodiments, the data transmission comprises M repetitions, wherein the demodulation reference signal is transmitted in N repetitions and is omitted in remaining M−N repetitions, N and M being positive integers. In some embodiments, the data transmission comprises M repetitions for each hop. The demodulation reference signal is transmitted in N repetitions for each hop and is omitted in remaining M−N repetitions for each hop, N and M being positive integers. In some embodiments, N and M are configured by the network device.

Figure 12:
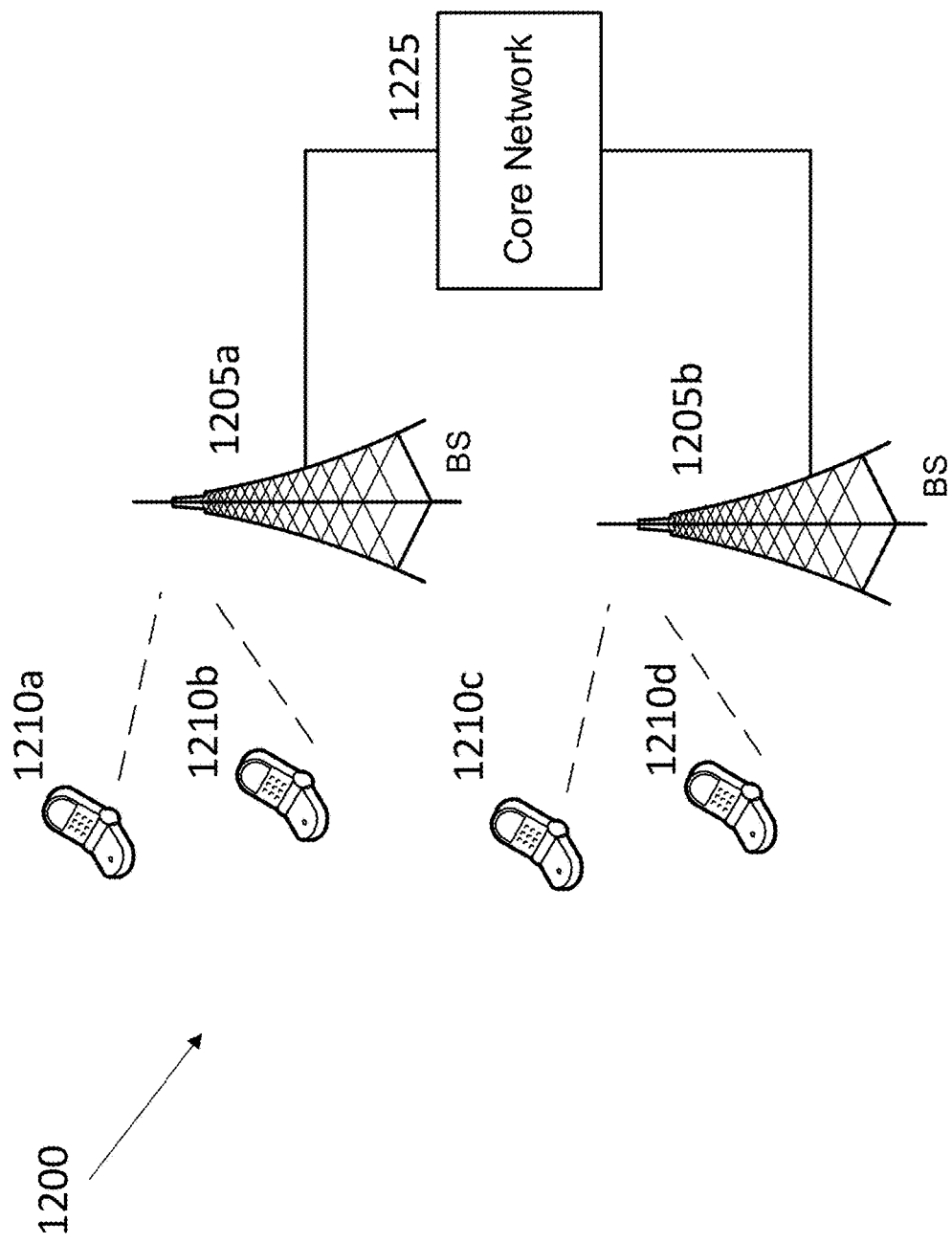
FIG. 12 shows an example of a wireless communication system where techniques in accordance with one or more embodiments of the present technology can be applied.

FIG. 12 shows an example of a wireless communication system 1200 where techniques in accordance with one or more embodiments of the present technology can be applied. A wireless communication system 1200 can include one or more network devices (BSs) 1205a, 1205b, one or more wireless devices 1210a, 1210b, 1210c, 1210d, and a core network 1225. A network device 1205a, 1205b can provide wireless service to wireless devices 1210a, 1210b, 1210c and 1210d in one or more wireless sectors. In some implementations, a network device 1205a, 1205b includes directional antennas to produce two or more directional beams to provide wireless coverage in different sectors.

The core network 1225 can communicate with one or more network devices 1205a, 1205b. The core network 1225 provides connectivity with other wireless communication systems and wired communication systems. The core network may include one or more service subscription databases to store information related to the subscribed wireless devices 1210a, 1210b, 1210c, and 1210d. A first network device 1205a can provide wireless service based on a first radio access technology, whereas a second network device 1205b can provide wireless service based on a second radio access technology. The network devices 1205a and 1205b may be co-located or may be separately installed in the field according to the deployment scenario. The wireless devices 1210a, 1210b, 1210c, and 1210d can support multiple different radio access technologies. The techniques and embodiments described in the present document may be implemented by the network devices of wireless devices described in the present document.

Figure 13:
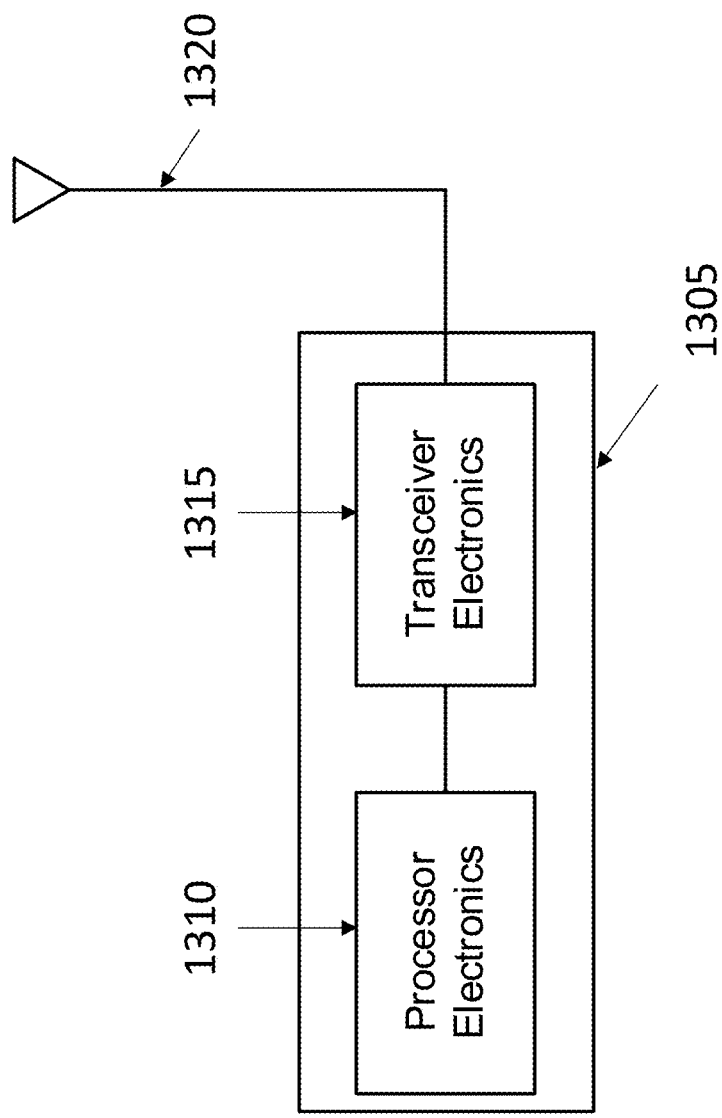
FIG. 13 is a block diagram representation of a portion of a radio station in accordance with one or more embodiments of the present technology can be applied.

FIG. 13 is a block diagram representation of a portion of a radio station in accordance with one or more embodiments of the present technology can be applied. A radio station 1305 such as a network device or a wireless device (or communication device) can include processor electronics 1310 such as a microprocessor that implements one or more of the wireless techniques presented in this document. The radio station 605 can include transceiver electronics 1315 to send and/or receive wireless signals over one or more communication interfaces such as antenna 1320. The radio station 1305 can include other communication interfaces for transmitting and receiving data. Radio station 1305 can include one or more memories (not explicitly shown) configured to store information such as data and/or instructions. In some implementations, the processor electronics 1310 can include at least a portion of the transceiver electronics 1315. In some embodiments, at least some of the disclosed techniques, modules or functions are implemented using the radio station 1305. In some embodiments, the radio station 1305 may be configured to perform the methods described herein.

It will be appreciated that the present document discloses techniques that can be embodied in various embodiments to enable flexible frequency hopping, thereby improving channel estimation performance and reducing inter-cell interference. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:
   receiving, by a communication device, a first message from a network device, wherein the first message comprises a list of frequency hopping offsets and a value indicating a number of repetitions of a data transmission, wherein the list of frequency hopping offsets comprises no less than four non-zero frequency hopping offsets;
   receiving, by the communication device, a second message from the network device, the second message indicating a selection of a frequency hopping offset from the list of frequency hopping offsets, wherein the selected frequency hopping offset is indicated using no less than two bits in the second message; and
   applying frequency hopping offsets to the number of repetitions of the data transmission, wherein each of the frequency hopping offsets is applied to a corresponding repetition in the data transmission, wherein the frequency hopping offsets includes multiple non-zero frequency hopping offsets such that different non-zero frequency hopping offsets are applicable to different repetitions, and wherein the multiple non-zero frequency hopping offsets are determined according to a rule associated with the selected frequency hopping offset, the rule specifying an order associated with the multiple non-zero frequency hopping offsets.

2. The method of claim 1, wherein a first frequency hopping offset of the multiple non-zero frequency hopping offsets is the selected frequency hopping offset.

3. The method of claim 1, wherein the order is an order in which frequency hopping offsets are organized in the list of frequency hopping offsets.

4. The method of claim 1, wherein the order is a predefined order of frequency hopping offsets.

5. A method for wireless communication, comprising:
transmitting, by a network device, a first message to a communication device, wherein the first message comprises a list of frequency hopping offsets and a value indicating a number of repetitions of a data transmission, wherein the list of frequency hopping offsets comprises no less than four non-zero frequency hopping offsets; and
transmitting, by the network device, a second message to the communication device, the second message indicating a selected frequency hopping offset in the list of frequency hopping offsets to enable the communication device to apply frequency hopping offsets to the number of repetitions of the data transmission, wherein the selected frequency hopping offset is indicated using no less than two bits in the second message, wherein each of the frequency hopping offsets is applied to a corresponding repetition in the data transmission, wherein the frequency hopping offsets includes multiple non-zero frequency hopping offsets such that different non-zero frequency hopping offsets are applicable to different repetitions, and wherein the multiple non-zero frequency hopping offsets are determined according to a rule associated with the selected frequency hopping offset, the rule specifying an order associated with the multiple non-zero frequency hopping offsets.

6. The method of claim 5, wherein a first frequency hopping offset of the multiple non-zero frequency hopping offsets is the selected frequency hopping offset.

7. The method of claim 5, wherein the order is an order in which frequency hopping offsets are organized in the list of frequency hopping offsets.

8. The method of claim 5, wherein the order is a predefined order of frequency hopping offsets.

9. The method of claim 5, wherein the rule is configurable by the network device.

10. A communication apparatus, comprising a processor configured to:
receive a first message from a network device, wherein the first message comprises a list of frequency hopping offsets and a value indicating a number of repetitions of a data transmission, wherein the list of frequency hopping offsets comprises no less than four non-zero frequency hopping offsets;
receive a second message from the network device, the second message indicating a selection of a frequency hopping offset from the list of frequency hopping offsets, wherein the selected frequency hopping offset is indicated using no less than two bits in the second message; and
apply frequency hopping offsets to the number of repetitions of the data transmission, wherein each of the frequency hopping offsets is applied to a corresponding repetition in the data transmission, wherein the frequency hopping offsets includes multiple non-zero frequency hopping offsets such that different non-zero frequency hopping offsets are applicable to different repetitions, and wherein the multiple non-zero frequency hopping offsets are determined according to a rule associated with the selected frequency hopping offset, the rule specifying an order associated with the multiple non-zero frequency hopping offsets.

11. The communication apparatus of claim 10, wherein a first frequency hopping offset of the multiple non-zero frequency hopping offsets is the selected frequency hopping offset.

12. The communication apparatus of claim 10, wherein the order is an order in which frequency hopping offsets are organized in the list of frequency hopping offsets.

13. The communication apparatus of claim 10, wherein the order is a predefined order of frequency hopping offsets.

14. A communication apparatus, comprising a processor configured to:
transmit a first message to a communication device, wherein the first message comprises a list of frequency hopping offsets and a value indicating a number of repetitions of a data transmission, wherein the list of frequency hopping offsets comprises no less than four non-zero frequency hopping offsets; and
transmit a second message to the communication device, the second message indicating a selected frequency hopping offset in the list of frequency hopping offsets to enable the communication device to apply frequency hopping offsets to the number of repetitions of the data transmission, wherein the selected frequency hopping offset is indicated using no less than two bits in the second message, wherein each of the frequency hopping offsets is applied to a corresponding repetition in the data transmission, wherein the frequency hopping offsets includes multiple non-zero frequency hopping offsets such that different non-zero frequency hopping offsets are applicable to different repetitions, and wherein the multiple non-zero frequency hopping offsets are determined according to a rule associated with the selected frequency hopping offset, the rule specifying an order associated with the multiple non-zero frequency hopping offsets.

15. The communication apparatus of claim 14, wherein a first frequency hopping offset of the multiple non-zero frequency hopping offsets is the selected frequency hopping offset.

16. The communication apparatus of claim 14, wherein the order is an order in which frequency hopping offsets are organized in the list of frequency hopping offsets.

17. The communication apparatus of claim 14, wherein the order is a predefined order of frequency hopping offsets.

18. The communication apparatus of claim 14, wherein the rule is configurable by the communication apparatus.

* * * * *

UNITED STATES PATENT AND TRADEMARK OFFICE
CERTIFICATE OF CORRECTION

PATENT NO. : 12,119,865 B2
APPLICATION NO. : 17/814639
DATED : October 15, 2024
INVENTOR(S) : Jian Li et al.

Page 1 of 1

It is certified that error appears in the above-identified patent and that said Letters Patent is hereby corrected as shown below:

In the Specification

In Column 3, Line 2, delete "configuration" and insert --control--
In Column 3, Line 4, delete "Indication" and insert --Indicator--
In Column 3, Line 58, delete "$\lfloor N_{symb}^{PUSCH,s}/2 \rfloor$" and insert --$\lfloor N_{symb}^{PUSCH,s}/2 \rfloor$,--

In the Claims

In Column 9, Line 14, delete "more them." and insert --more of them.--

Signed and Sealed this
Twenty-fourth Day of December, 2024

Derrick Brent
*Acting Director of the United States Patent and Trademark Office*